US009705776B1

(12) United States Patent
Workman et al.

(10) Patent No.: US 9,705,776 B1
(45) Date of Patent: *Jul. 11, 2017

(54) WIRELESS NETWORK POLLING AND DATA WAREHOUSING

(71) Applicant: CSC Holdings, LLC, Bethpage, NY (US)

(72) Inventors: Reginald N. Workman, Austin, TX (US); Edward J. Keenan, Syosset, NY (US); Brian Daniels, Commack, NY (US); Christopher Cioffi, Holbrook, NY (US); John Nicastro, Smithtown, NY (US); Bryn L. Chung, North Babylon, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,606

(22) Filed: Aug. 24, 2015

Related U.S. Application Data

(63) Continuation of application No. 13/863,711, filed on Apr. 16, 2013, now Pat. No. 9,119,099, which is a continuation of application No. 12/490,153, filed on Jun. 23, 2009, now Pat. No. 8,427,977.

(51) Int. Cl.
*H04W 4/00* (2009.01)
*H04L 12/26* (2006.01)
*H04W 64/00* (2009.01)
*H04L 29/08* (2006.01)

(52) U.S. Cl.
CPC .............. *H04L 43/10* (2013.01); *H04L 43/04* (2013.01); *H04L 43/0882* (2013.01); *H04L 67/18* (2013.01); *H04W 64/006* (2013.01)

(58) Field of Classification Search
None
See application file for complete search history.

(56) References Cited

U.S. PATENT DOCUMENTS

| 5,699,244 A * | 12/1997 | Clark, Jr. | G06F 3/033 |
| | | | 701/469 |
| 8,427,977 B2 * | 4/2013 | Workman | H04W 4/02 |
| | | | 370/254 |
| 9,119,099 B2 * | 8/2015 | Workman | H04W 4/02 |

(Continued)

*Primary Examiner* — Chi H Pham
*Assistant Examiner* — Shick Hom
(74) *Attorney, Agent, or Firm* — Sterne, Kessler, Goldstein & Fox PLLC

(57) ABSTRACT

Methods and systems are provided to collect and update data on client devices connected to WiFi access points is provided. An inventory of WiFi cable modems and WiFi access points coupled to the WiFi cabled modems within a specific network is periodically collected. Internet Protocol (IP) addresses of WiFi cable modems and WiFi access points coupled to the WiFi cabled modems are periodically updated. Traps are periodically received from the WiFi access points. The traps are parsed to collect an inventory of client devices wirelessly connected to the WiFi access points and a time at which a client device connected to the WiFi access point. The WiFi access points are periodically polled to collect data on client devices, the data including a period of time that a client device has been connected to a WiFi access point and a physical location of the client device.

20 Claims, 10 Drawing Sheets

(56) References Cited

U.S. PATENT DOCUMENTS

2006/0265489 A1* 11/2006 Moore .................... H04L 69/40
709/223
2008/0043989 A1* 2/2008 Furutono .............. H04M 3/367
379/269

* cited by examiner

WIRELESS NETWORK POLLING AND DATA WAREHOUSING

CROSS-REFERENCE TO RELATED APPLICATIONS

This application is a continuation of U.S. Pat. No. 9,119,099, filed Apr. 16, 2013, which is a continuation of U.S. Pat. No. 8,427,977, filed Jun. 23, 2009, both of which are incorporated herein by reference herein in their entireties.

BACKGROUND OF THE INVENTION

Field of the Invention

The present invention is generally related to wireless networks and more specifically to wireless network polling.

Background of the Invention

WiFi is a term typically used for a high-frequency wireless local area network (WLAN). WiFi is a trademark of the Wi-Fi Alliance for certified products based on the IEEE 802.11 standards. A Wi-Fi enabled computational device such as a computer, game console, mobile phone, MP3 player or personal digital assistant (PDA) can connect to the Internet via a WiFi access point within range of the computational device. The coverage of one or more interconnected WiFi access points can comprise an area as small as a single room or as large as many square miles covered by overlapping access points.

WiFi access is typically provided by WiFi access providers such as cable network or Internet companies. However, WiFi providers are limited in the amount of information available about WiFi usage statistics of client devices such as a period of time for which a client device is connected to a WiFi access point, physical location of a client device within a network or congestion statistics for a particular WiFi access point. Furthermore, there is a need for real time polling of WiFi devices in a network for troubleshooting purposes.

Methods and systems are needed to overcome the above mentioned deficiencies.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Example Network

Figure 1:
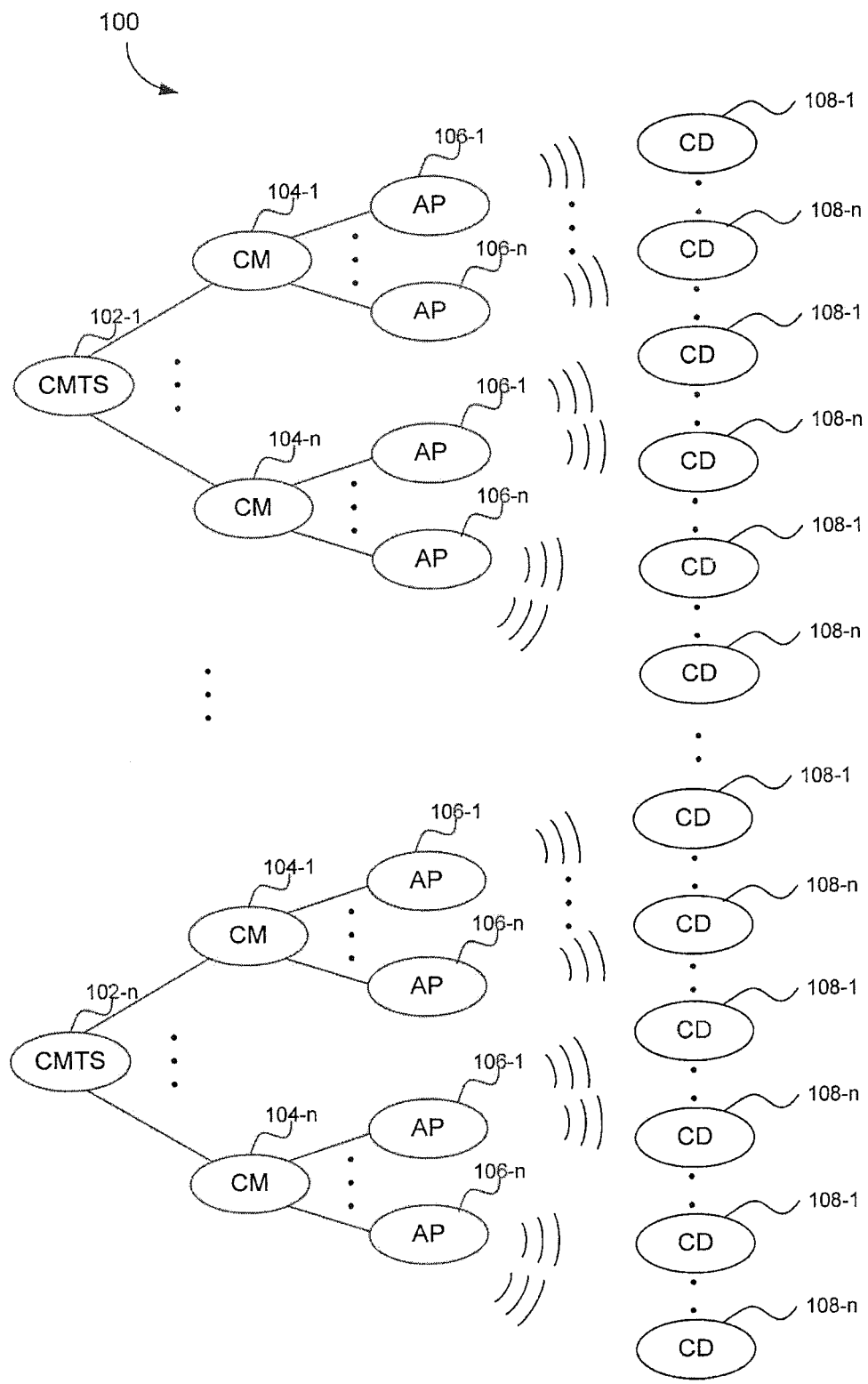
FIG. 1 illustrates an example network according to an embodiment of the invention.

FIG. 1 illustrates an example network 100 according to an embodiment of the invention.

Network 100 may be, for example, a Wireless Local Area Network (WLAN). Network 100 includes cable modem termination system (CMTS) 102-1 to 102-n. Network 100 also includes cable modems (CMs) 104-1 to 104-n coupled to each of cable modem termination systems 102. In an embodiment, cable modems 104 are WiFi cable modems. The terms cable modem and WiFi cable modem may be used interchangeably throughout the specification. Network 100 also includes WiFi access points 106-1 to 106-n coupled to each of cable modems 104. WiFi access point 106 may also be referred to interchangeably as an access point or a radio throughout the present specification. Network 100 may also include client devices (CDs) 108-1 to 108-n that are wirelessly coupled to access points 106. It is to be appreciated that "n" is an arbitrary number. It is also to be appreciated that the number of cable modem termination systems, cable modems, access points and client devices although represented by "n" will also vary, that is, the number of cable modem termination systems 102, cable modems 104, access points 106 and client devices 108 are not equal.

Access points 106 allow client devices 108 to wirelessly access the Internet. Client devices 108 may be any computational device configured to wirelessly connect to access points 106. For example, client device 108 may be a cell phone, personal digital assistant (PDA) or a computer that is WiFi compatible. In an embodiment client device 108 may be any computational device that is compatible with the 802.11b WLAN specification.

A "trap" is generated by a WiFi access points 106 when a client device 108 attempts to connect to an access point 106. A client device 108 may connect to WiFi access point 106 by simply being within range of the access point 106, or if the client device 108 attempts to login to one of networks 212, 222 and 226 (see FIG. 2) via an access point 106. The trap is a software notification generated by an access point 106 using the Simple Network Management Protocol (SNMP). The trap may include, for example, Internet Protocol (IP) address and Media Access Control (MAC) address of the client device 108. The trap may also indicate the time at which a client device attempted to connect to an access point 106. In an embodiment a trap may be a fault management trap where the trap is generated by an access point 106 to indicate a major, minor or critical alarm relating to operational status of an access point 106. A minor alarm may be generated, for example, if performance of an access point 106 in terms of available bit rate is below a particular threshold. A major alarm may be generated, for example, if multiple packets are being dropped by an access point 106 resulting poor quality of service (QoS). A critical alarm may be generated, for example, if an SNMP tunnel malfunctions or if an access point 106 is not operational due to a hardware or software malfunction.

As described above, traps provide some amount of information on client devices 108 and access points 106, however, traps by themselves are unable to provide information on, for example, a period of time for which a client 108 device is connected to a specific access point 106 in a specific network, the geographic location of a client device 108 or the amount of traffic being experienced by an access point 106. Furthermore, there is a long felt need of WiFi service providers to have real time and on-demand access to WiFi access point 106 inventory, historical tracking of usage patterns of a client device 108, a physical location of a client device and on-demand real time polling of client devices 108.

Accordingly, embodiments presented herein provide methods to collect and update data on client devices connected to WiFi access points either periodically or in real time. The method includes periodically collecting an inventory of WiFi cable modems and WiFi access points coupled to the WiFi cable modems within a specific network and periodically updating Internet Protocol (IP) addresses of WiFi cable modems and WiFi access points coupled to the WiFi cabled modems. The method further allows receiving traps from the WiFi access points and parsing the traps to collect an inventory of client devices wirelessly connected to the WiFi access points and a time at which a client device connected to a WiFi access point. The method also includes polling, periodically or in real time, the WiFi access points to collect data on client devices, the data including a period of time that a client device has been connected to a WiFi access point and a physical location of the client device. Embodiments presented below further describe the method and system to collect and update data on client devices connected to WiFi access points.

Example Distributed Network Architecture

Figure 2:
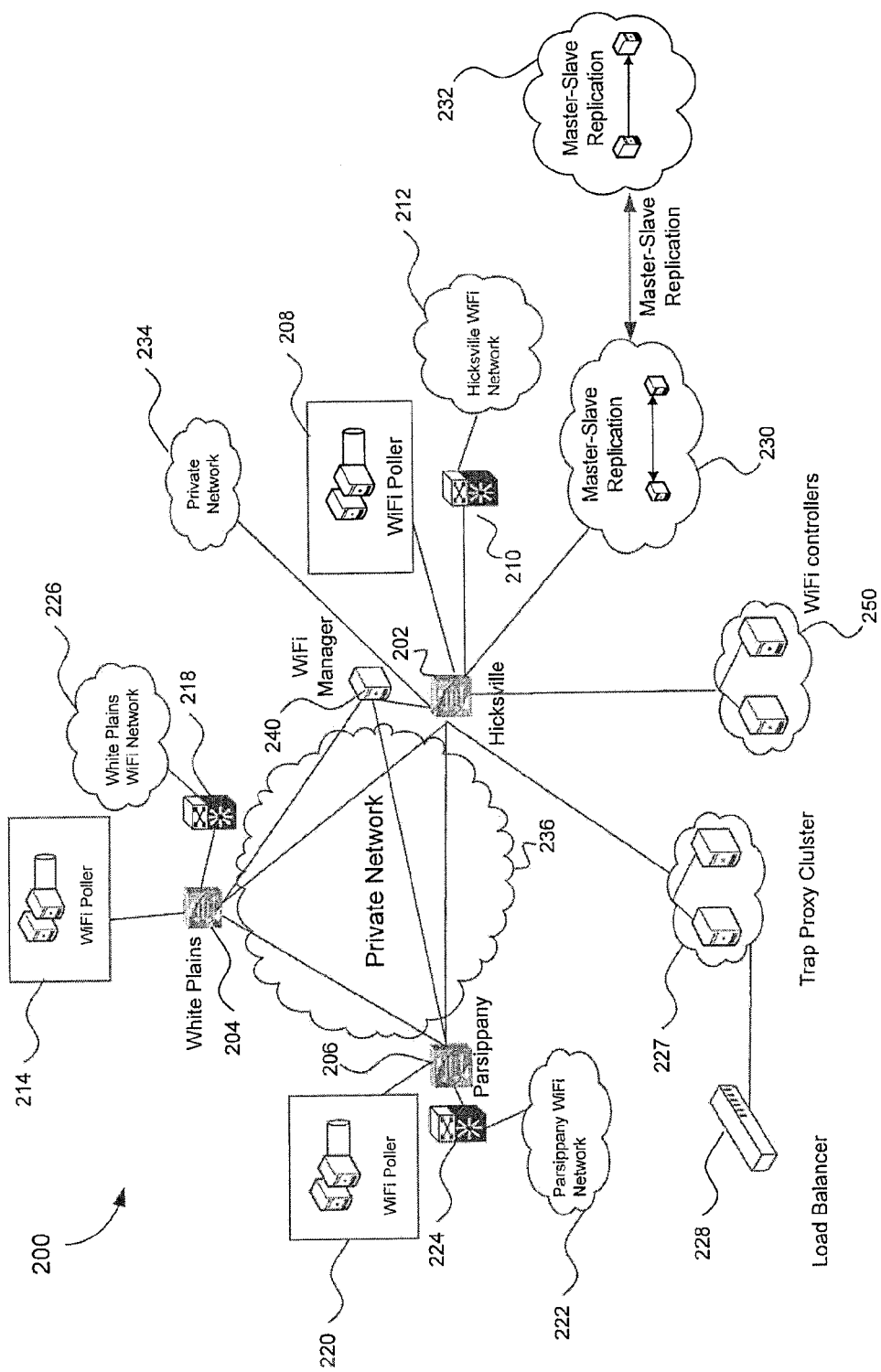
FIG. 2 illustrates an example distributed network architecture according to an embodiment of the invention.

FIG. 2 illustrates an example distributed network architecture 200 according to an embodiment of the invention.

Network 200 includes, for example, network 236, network 234, network 226, network 222, and network 212. Network 200 also includes master headends (MHEs) 202, 204 and 206. Network 200 also includes WiFi pollers 208, 214 and 220; banks of switches and routers 210, 218 and 224; WiFi manager 240; trap proxy cluster 227; load balancer 228; WiFi controllers 250 and databases 230 and 232.

Each of networks 212, 222 and 226 may be similar to, for example, network 100 illustrated in FIG. 1. For example, each of WiFi networks 226, 222 and 212 may include multiple cable modem termination systems 102, cable modems 104, access points 106, and client devices 108. Banks of switches and routers 210, 218 and 224 are configured to route data to/from respective networks 212, 226 and 222 to respective master headends 202, 204 and 206 or respective WiFi pollers 208, 214 and 220.

Master headends 202, 204 and 206 may be located in geographically separated locations, for example, master headend 202 may be located in Hicksville, master headend 204 may be located in White Plains, and master headend 206 may be located in Parsippany. The geographically distributed architecture allows each master headend to service its own geographic location. Also, if a master headend e.g. master headend 202 is non-functional, for example because of a local power outage or a storm, then the geographically distributed architecture allows for master headends 204 and 206 to share the functions performed by master headend 202 while the problem is resolved.

Master headends 202, 204, and 206 may be part of network 236. Network 236 may be a private network that is used to route data between master headends 202, 204 and 206. Each master headend is coupled to a switch and router bank, a WiFi poller and a network such as network 100. For example, master headend 202 is coupled to a bank of switches and routers 210, WiFi poller 208 and to network 212. Master headend 204 is coupled to WiFi poller 214, bank of switches and routers 218 and network 226. Master headend 206 is coupled to WiFi poller 220, a bank of switches and routers 224, and network 222. In an embodiment, WiFi pollers 208, 214 and 220 may be part of master headend 202, 204 and 206 respectively and methods performed by WiFi pollers 208, 214 and 220 as described below may be performed by master headends 202, 204 and 206 and vice versa. Master headend 202 is also coupled to WiFi manager 240, database 230 and trap proxy cluster 227. In an embodiment, one or both of WiFi manager 240, trap proxy cluster 227 and databases 230, 232 may be part of master headend 202 and methods described below as performed by WiFi manager 240 and trap proxy cluster 227 may be performed by master headend 202 and vice versa.

Master headends 202, 204 and 206 may be coupled to CMTSs 102 and may run applications that periodically, for example daily, collect an inventory of WiFi cable modems 104 and WiFi access points 106 within networks 222, 226 and 234. These applications may discover new WiFi cable modems 104 and access points 106 within networks 222, 226 and 234. In an embodiment, each master headend 202, 204 and 206 periodically, for example every 15 minutes, collects a MAC address and an IP address from every CMTS 102 in networks 212, 222 and 226. CMTS 102 are queried to determine IP and MAC addresses of active cable modems 106. An inventory of access points 106 coupled to a cable modem 104 may be obtained by querying a CMTS 102 using a MAC address of the cable modem 104. Cable modems 104 may be grouped by CMTS 102 they are coupled to, and a telnet session may be opened to the CMTS 102 to obtain the access points 106 associated with each cable modem 104. If no access point 106 is discovered via telnet to a particular cable modem 104, then that cable modem's bridge table may be queried via SNMP to determine if a MAC address of an access point 106 is available. The SNMP query may return only a MAC address for an access point 106 and not an IP address for that access point 106. If no MAC address is found in a cable modem's bridge table then a place holder is used in a record for that cable modem 104 until an access point 106 is discovered.

A MAC address for a WiFi device may be used as a unique identifier for each record in database 230 since the MAC address does not change. If a MAC address for a WiFi cable modem 104 is not found in database 230 then a new record is inserted in database 230 with the MAC address as a key for that record. If a WiFi cable modem or access point MAC address is already listed for the cable modem or access point in database 230, then the corresponding record is updated during a polling process (described below) with data such as an IP address. WiFi cable modems 104 and WiFi access points 106 are assigned IP addresses via Dynamic Host Configuration Protocol (DHCP). According to an aspect of DHCP, the IP addresses of cable modems 104 and access points 106 are subject to change for a number of reasons including but not limited to rebooting, lease expiration and extended period of downtime. Accordingly, in an embodiment, master headends 202, 204 and 206 may also periodically, for example every hour, update Internet Protocol (IP) addresses of WiFi cable modems 104 and WiFi access points 106 within networks 222, 212 and 226. Every WiFi cable modem 104 may be grouped by the CMTS 102 it is associated with, and a telnet session may be opened to the CMTS 102 to query the access points 106 associated with the cable modem 104. The IP address obtained for the access point 104 is compared to the IP address already stored access point, and if there is a change to the IP address of the access point 104, then the corresponding record is updated with the current IP address. For access points, such as for example, Cisco™ WiFi access points, that are not directly accessible via SNMP, WiFi controllers 250 may periodically collect and update IP addresses of these access points 106.

Trap proxy cluster 227 may include multiple servers and may run an application that receives traps from WiFi access points 106. Traps generated by access points in network 212, 226, and 222 are eventually routed to trap proxy cluster 227. A trap may be sent by an access point 106 to a cable modem 104 which sends it to a cable modem termination system 102 in one of networks 212, 222 and 226 and eventually to trap proxy cluster 227. Trap proxy cluster 227 may parse the traps to collect an inventory of client devices 108 connected to the WiFi access points 106 and a time at which a client device 108 connected to a WiFi access point 106. Traps received directly from access points 106, for example traps generated by BelAir™ access points may include client device MAC address, IP address, DHCP state, and the Virtual Local Area Network (VLAN) that the access point 106 is associated with. These traps originate from the access point 106 itself, so the MAC address of the access point 106 can be determined by the source address of the trap. Traps received indirectly, for example traps generated by Cisco™ access point 106, via WiFi controller 250 include a MAC address for the access point 106 and the client device 108 associated with the access point 106. For these traps, additional client session data points may be obtained by SNMP polling WiFi controllers 250 as described below.

Load balancer 228 is a device to divide traps received from networks 212, 222, and 226 between multiple servers in trap proxy cluster 227 so as to equally distribute the load for parsing the traps. It is to be appreciated that the number of servers in trap proxy cluster 227 is arbitrary, and may change based on implementation.

WiFi manager 240 may be a server that runs an application that distributes the number of WiFi access points 106 to be polled between servers in WiFi pollers 208, 214 and 220. WiFi manager 240 may distribute the list of access points 106 in a round robin scheme so as to load balance the number of access points that need to be polled. WiFi manager 240 also verifies status of WiFi pollers 208, 214 and 220 i.e. whether the pollers are operational and rolls up the session data after the polling cycle is complete. The polling cycle runs periodically, for example every 15 minutes, so that data on client devices 108 is never older than a polling cycle time period. At the beginning of each polling cycle the WiFi manager 240 may query access points 106 from an access point inventory table in database 230 to determine access points that that have been active within, for example, the last hour. WiFi manager 240 may also check the status of the servers (whether they are available) within WiFi pollers 208, 214 and 216 and divide the number of access points 106 to be polled by the number of available servers, ensuring that an even number of access points are distributed amongst WiFi pollers 208, 214 and 220. If one of the WiFi pollers 208, 220, and 214 is inoperational then WiFi manager also redistributes the WiFi access points 106 to be polled equally amongst operational the remaining WiFi pollers 208, 214 and 220.

Each of WiFi pollers 214, 208, and 220 includes at least one server and runs an application that periodically, for example every 15 minutes, polls WiFi access points 106 to collect data on client devices 108. The application may be started by WiFi manager 240 at the beginning of each polling cycle every 15 minutes. The polling application reads in a list of access points 106 that it was assigned to poll for that cycle by WiFi manager 240 and initiates a threaded process for each access point 106. The threaded process performs an SNMP "get table" request of a client table on an access point 106. A separate threaded process listens for responses from the access point 106 to the SNMP requests, formats the data, and checks if there is a record for that client device on that access point within 15 minutes in a staging table. If there is a record present, the record is updated with the supplemental data not found in a trap that was previously received from the access point 106, and updates a timestamp of the record to indicate that the client device 108 is still associated with the specific access point 106.

A static list of IP addresses for WiFi controllers 250 is stored in database 230. Each controller 250 may include three tables that may be polled. The three tables may be an access points table including IP and MAC addresses for access points 106, a clients table that includes IP and MAC addresses for client devices 108 and a Received Signal Strength Indication (RSSI) data table where each record in the RSSI data table corresponds to a session in the client table, and each record in the clients table corresponds with a record in the access point table. The polling application performs an SNMP "get table" request from each table, correlates the data from the three tables, and inserts the data as a single record into a staging table in database 230 that includes a complete record for a client device 108 including but not limited to, client IP, client MAC, time for which a client device 108 has been connected to an access point 106 and geographic location of a client device 108.

All of the data from the traps, complimented with the data from polling is stored in database 230. At the end of each polling cycle, WiFi manager 240 runs a client rollup application which collects completed records from the staging table and inserts them into a client rollup table in database 230. Records in the client rollup table are updated if a client device 108 is still connected to an access point 106 on subsequent polls.

In an embodiment, data collected on client devices 108 includes a period of time that a client device 108 is connected to a WiFi access point 106 and a physical (i.e. geographic) location of the client device such as Global Positioning Satellite (GPS) coordinates.

Databases 230, 232 may be, for example, mySQL™ clusters. Database 230 may be in a master-slave configuration with database 232 to allow for redundancy if one of database 230 or database 232 is non-functional. Each of databases 230 and 232 may each include at least two servers in a master-slave configuration to allow for further redundancy.

Private network 234 which allows users, for example network administrators or cable operators, to access data from master headend 202 on the status of cable modem termination systems 102, cable modems 104, access points 106, and client devices 108 in any of networks 222, 226 and 212 and data on collected on client devices 108. Network 234 also allows users to access data on client devices 108 that are stored in database 230. Upon receiving a fault management trap, a master headend such as master headend 202 may indicate the error condition for a particular access point 106, for example, on a web page which may be accessible by network technicians via private network 234.

Example Methods

Figure 3:
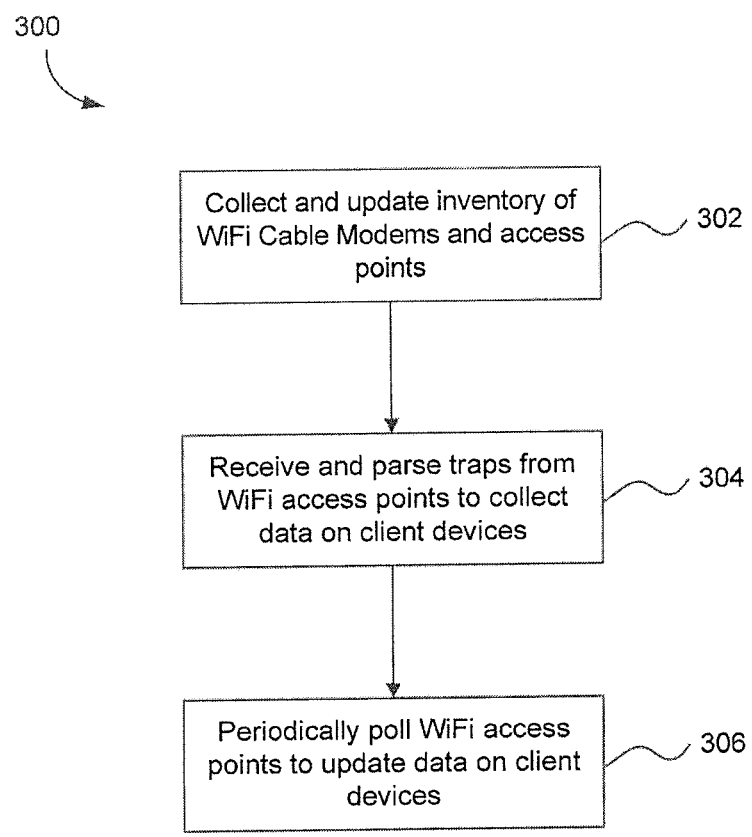
FIG. 3 illustrates an example flowchart of a method for collecting information on WiFi access points and clients connected to WiFi access points according to an embodiment of the invention.

FIG. 3 illustrates an example flowchart 300 of a method for collecting information on WiFi access points and clients connected to WiFi access points according to an embodiment of the invention. Flowchart 300 will be described with continued reference to the example operating environment depicted in FIGS. 1-2. However, the flowchart is not limited to these embodiments. Note that some steps shown in flowchart 300 do not necessarily have to occur in the order shown.

In step 302, an inventory of WiFi access points and cable modems is collected and updated. For example, an inventory of cable modems 104 and access points 106 in networks 212, 222 and 226 is collected and periodically updated. Flowchart 400 in FIG. 4 further details a method for collecting inventory of access points 106 and cable modems 104. FIG. 5A-5B illustrate flowchart 500 that further details a method to periodically update the inventory of access points 106 and cable modems 104 according to an embodiment of the invention. In an embodiment, master headends 202, 204 and 206 may collect and update an inventory of WiFi access points 104 and cable modems 104.

In step 304, traps are received from access points. Furthermore, traps are parsed to create and/or update records of access points 106 and client devices 108 connected to the access points 106. The traps are also parsed to collect an inventory of client devices 108 wirelessly connected to the access points 106 and a time at which a client device 108 is connected to a WiFi access point 106. Flowchart 600 in FIG. 6 further illustrates a method to collect and update an inventory of client devices 108.

In step 306, WiFi access points 106 are periodically polled to collect and/or update data on client devices 108. Flowchart 700 in FIG. 7, described below, further describes a method 800 to update client device inventory by polling WiFi access points. Flowchart 800 in FIG. 8, described below, further describes a method to periodically collect data from WiFi controllers 250.

Figure 4:
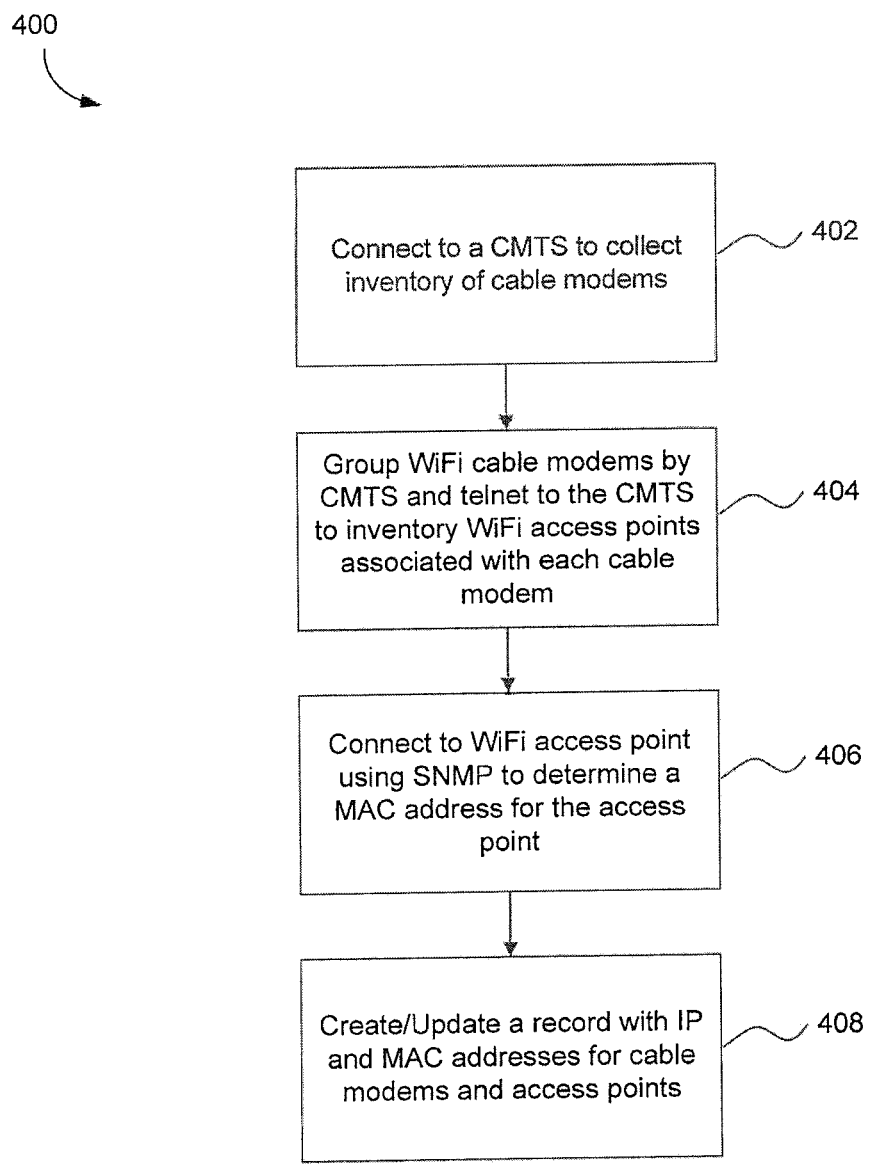
FIG. 4 illustrates and example flowchart of a method to collect inventory of WiFi access points and cable modems according to an embodiment of the invention.

FIG. 4 illustrates and example flowchart 400 of a method to collect inventory of WiFi access points and cable modems according to an embodiment of the invention. Flowchart 400 will be described with continued reference to the example operating environment depicted in FIGS. 1-2. However, the flowchart 400 is not limited to that embodiment. Note that some of the steps in flowchart 400 do not necessarily have to occur in the order shown.

In step 402, WiFi cable modems are periodically discovered by polling cable modem termination systems in a network to determine new WiFi cable modems coupled to the cable modem termination systems. For example, cable modem termination systems 102 in each of networks 212, 222 and 226 are queried via telnet by master headends 202, 206 and 204 respectively to discover new WiFi cable modems 104 connected to the cable modem termination systems 102.

In step 404, WiFi cable modems are grouped by the cable modem termination system they are coupled to and the associated cable modem termination system is accessed via telnet to obtain an inventory of WiFi access points associated with each cable modem. For example, WiFi cable modems 104 are grouped based on the cable modem termination system 102 that they are associated with and each cable modem termination system 102 is queried via telnet to obtain an inventory from cable modems 104 of the access points 106 that are associated with the cable modem 104. This step may be performed, for example, by each of master headends 202, 204 and 206. The inventory may include IP and MAC addresses of access points associated with a cable modem. If no access points are found then a cable modem may be queried via Simple Network Management Protocol (SNMP) as described in step 406.

In step 406, access points that are accessible via SNMP are queried using SNMP to obtain the MAC addresses for the access points. For WiFi access points that cannot be queried directly via SNMP, a custom integration may done by using a controller that communicates with the WiFi access points to obtain the IP and MAC addresses of the WiFi access points. For example, access points are queried by master headends 202, 204 and 206 using SNMP to obtain the MAC addresses of the access points 106. For access points 106 that cannot be directly queried via SNMP, a custom integration is done with WiFi controller 250 to obtain IP and MAC address data of the access points 106.

In step 408, IP and MAC addresses for WiFi cable modems and their associated access points are inserted into a database. If a record already exists for the access point or the cable modem, then that record is updated. For example, master headends 202, 204 and 206 update records in database 230 for new WiFi access points coupled to cable modems 104. If a record does not exist for a cable modem 104 and/or access point 106, then a new record is created by a master headend in database 230.

Figure 5:
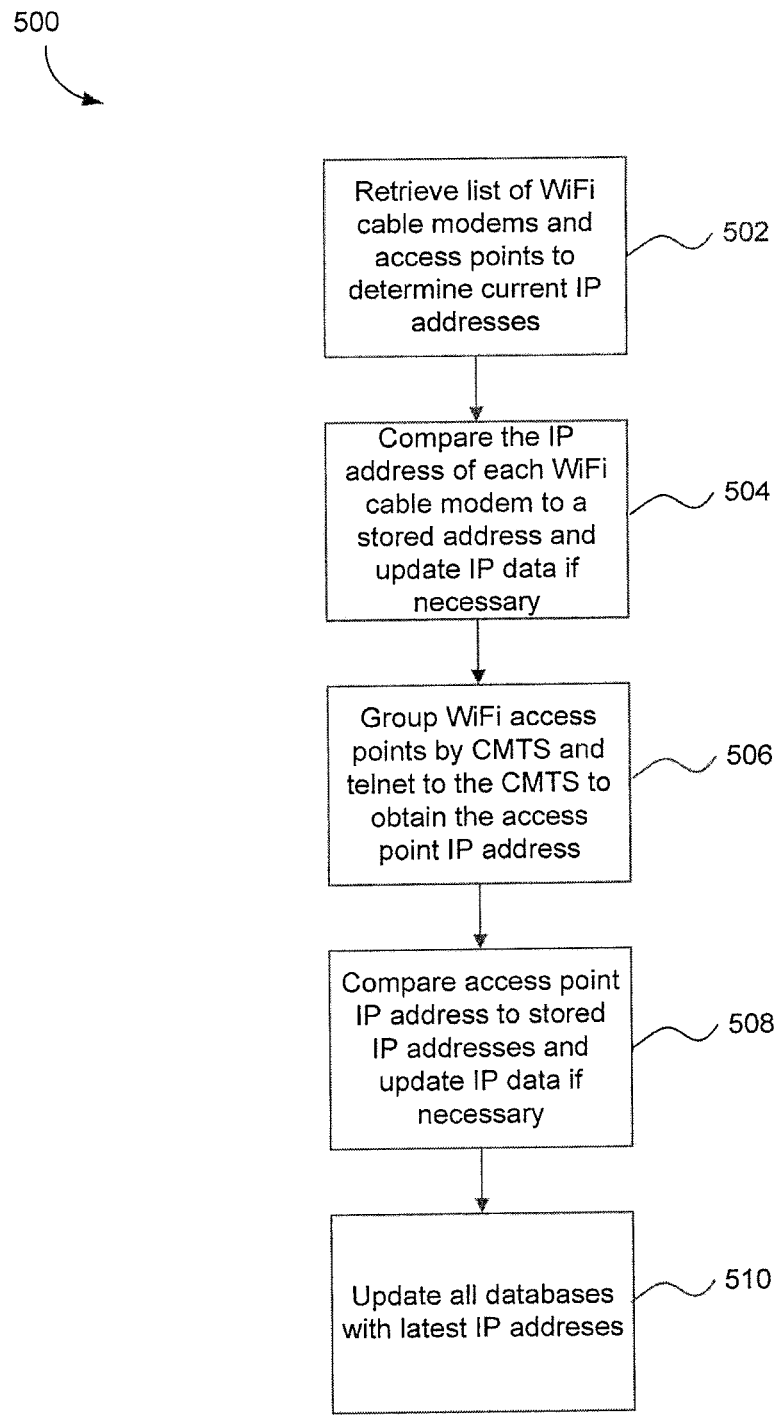
FIG. 5 illustrates an example flow chart of a method to update IP addresses of WiFi access points according to an embodiment of the invention.

FIG. 5 illustrates an example flow char 500 of a method to update IP addresses of WiFi access points according to an embodiment of the invention. Flow chart 500 will be described with continued reference to the example operating environment depicted in FIGS. 1-2. However, the flow chart 500 is not limited to that embodiment. Note that some of the steps shown in flow chart 500 do not necessarily have to occur in the order shown.

In step 502, a list of cable modems is retrieved and polled for current IP addresses. For example, a list of cable modems 104 and access points 106 in database 300 is retrieved and a telnet session is opened to cable modem termination systems 102 to query WiFi cable modems 104 and access points 106 for their current IP addresses.

In step 504, the current IP address of each WiFi cable modem is compared to a previously stored IP address for that cable modem. If the current IP address determined in step 502 and the stored IP address are not equal, then stored IP address in the record is updated with the current IP address. For example, master headend 202, 204 and/or 206 determines a current IP address for each cable modem 104 and compares and updates IP addresses for cable modems 104 in database 230.

In step 506, WiFi access points queried in step 502 are grouped according to the cable modem termination system they are associated with and a telnet session is opened to the cable modem termination system to obtain a current IP address for each WiFi access point. For example, WiFi access points 106 are grouped according to the cable modem termination system 102 they are associated with and each cable modem termination system is then queried via a telnet session to obtain a current IP address for each WiFi access point 106.

In step 508, the current IP address of each WiFi access point is compared to a previously stored IP address for that access point. If the current IP address determined in step 506 and the stored IP address are not equal, then the stored IP address in the record is updated with the current IP address.

In step 510, the IP address changes for WiFi access points and cable modems are are updated in all databases. For example, master headends 202, 204 and/or 206 update IP addresses for access points 106 and cable modems 104 in databases 230 and 232.

Figure 6A:
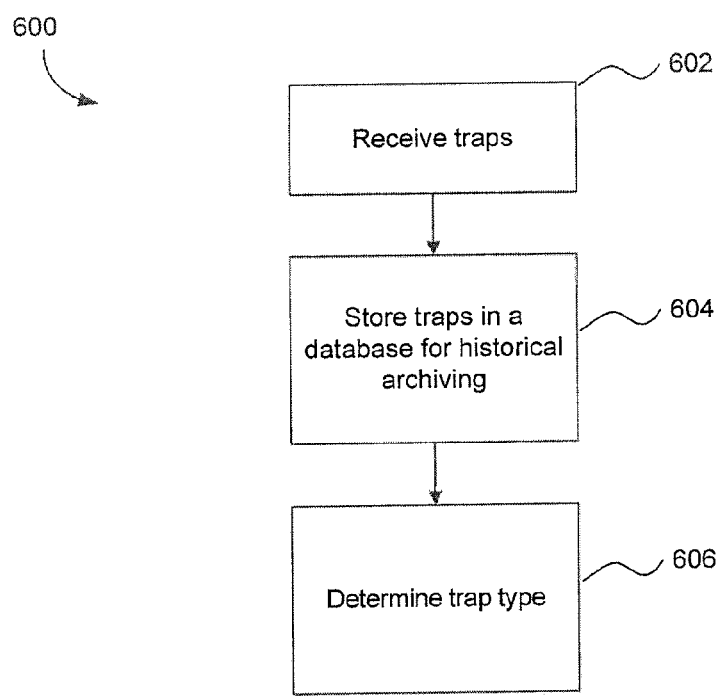
FIG. 6A illustrates an example flow chart of a method to receive and parse traps so as to create and/or update client inventory records.

FIG. 6A illustrates an example flow chart 600 of a method to receive and parse traps so as to create and/or update client inventory records. Flow chart 600 will described with continued reference to the example operating in environment depicted in FIGS. 1-2. However, flow chart 600 is not limited to these embodiments. Note that some of the steps in flow chart 600 do not necessarily have to occur in the order shown.

In step 602, traps are received. For example, when a client device 108 attempts to connect to an access point 106, a trap is generated by the access points 106 and is received by master headend 202, 204 or 206. The trap is forwarded to trap proxy cluster 227 and distributed by load balancer 228 between servers in trap proxy clusters 226.

In step 604, the trap received in step 602 is stored in a database for statistical purposes and historical archiving. For example, traps may be stored in database 230 for statistics on access point 106 usage and congestion levels in a particular geographic area where the WiFi access point 106 that generating the trap is located.

In step 606, a trap is inspected to determine the type of trap that was received in step 602. For example, it may be determined which vendor the access point 106 that generated the trap corresponds to. In an example, a trap may be generated by, for example, a BelAir™ access point or a Cisco™ access point. BelAir™ access points may directly send traps to a master headend. Cisco™ access points may directly send the traps to WiFi controller 250 and traps from WiFi controller 250 may be sent to one or more of master headends 202, 204 or 206. Traps from a first vendor, e.g. BelAir™ may include IP and MAC addresses for client devices 108 and access points 106, whereas traps from a second vendor, for example Cisco™, may include only client device and access point MAC addresses. The method to parse traps for client device 108 data is discussed below with regards to the flow chart in FIG. 6B below.

Figure 6B:
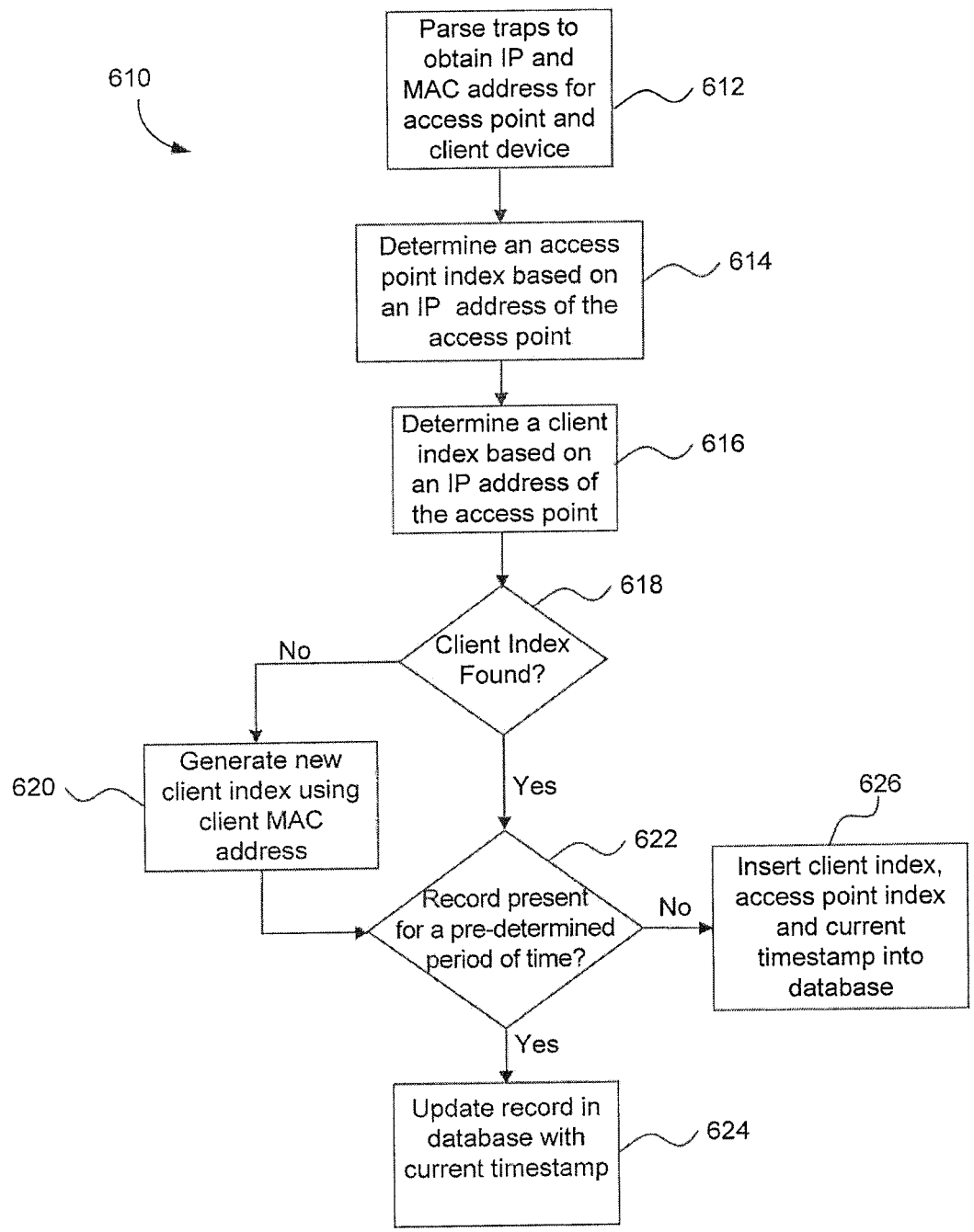
FIG. 6B illustrates an example flow chart of a method to parse traps according to an embodiment of the invention.

FIG. 6B illustrates an example flow chart 610 of a method to parse traps according to an embodiment of the invention. Flow chart 610 will be described with continued reference to the example operating environment depicted in FIGS. 1-2. However, flow chart 610 is not limited to that embodiment. Note that some of the steps in flow chart 610 do not necessarily have to occur in the order shown.

In step 612, traps are parsed to obtain IP and MAC addresses for a client device and an access point that generated a trap. For example, traps are inspected to determine IP and MAC addresses for access points 106 and an associated client device 108 that caused the access point 106 to generate the trap. For example, trap proxy cluster 227 may parse a trap to determine a MAC address and an IP address of a client device 108 and a WiFi access point 106 that generated a trap, based on information in the trap.

In step 614, an index for the access point, the index being stored in a database, is determined for the WiFi access point based on the IP address of the WiFi access point determined in step 612. For example, trap proxy cluster 227 may determine an access point index in database 230 for the access point 106 that generated a trap, using the access point IP address determined in step 612.

In step 616, a client device index, stored in a database, is determined for the client device based on the IP address for the access point that the client device connected to. For example a client index is determined by trap proxy cluster 227 by looking up a client inventory table in database 230 using the access point IP address determined in step 612.

In step 618, it is determined whether a client index is found for the client IP address. If the client index is not found in step 618, then the process proceeds to step 620. If a client index is found, then the process proceeds to step 622.

In step 620, the client MAC address is inserted into a client inventory table and a new client index is generated based on the client MAC address. For example, client MAC address determined in step 612 is inserted into a client inventory table in database 230 by trap proxy cluster 227 and a new client index is generated for that client MAC address. The process proceeds to step 722.

In step 622, it is determined if a record for the client index was present in the database for a predetermined period of time. For example, it may be determined by trap proxy cluster 227 whether a record for the client index was present in database 230 within the last sixty seconds. If no record is present with the predetermined amount of time, then the process proceeds to step 626. If a record is present within the last sixty seconds, then the process proceeds to step 624.

In step 624, the record is updated with the current time stamp to indicate when the trap was received and which access point generated the trap. For example, trap proxy cluster 227 updates a record in database 230 for a client device and access point to indicate the time at which the trap was generated by an access point 106 and for which client device 108 the trap was generated. This also allows collection of usage statistics for each access point 106 and each client device 108 as well. For example, this allows collection of information on which access point 106 has the greatest amount of activity in terms of client devices 108 attempting to connect to the access point 106.

In step 626, a record is created and stored in a database. The record includes the client index and WiFi access point index and the time at which the trap was generated. For example, trap proxy cluster 227 generates a record including the client index, the access point index and time at which the trap was generated and stores it in database 230.

Figure 7:
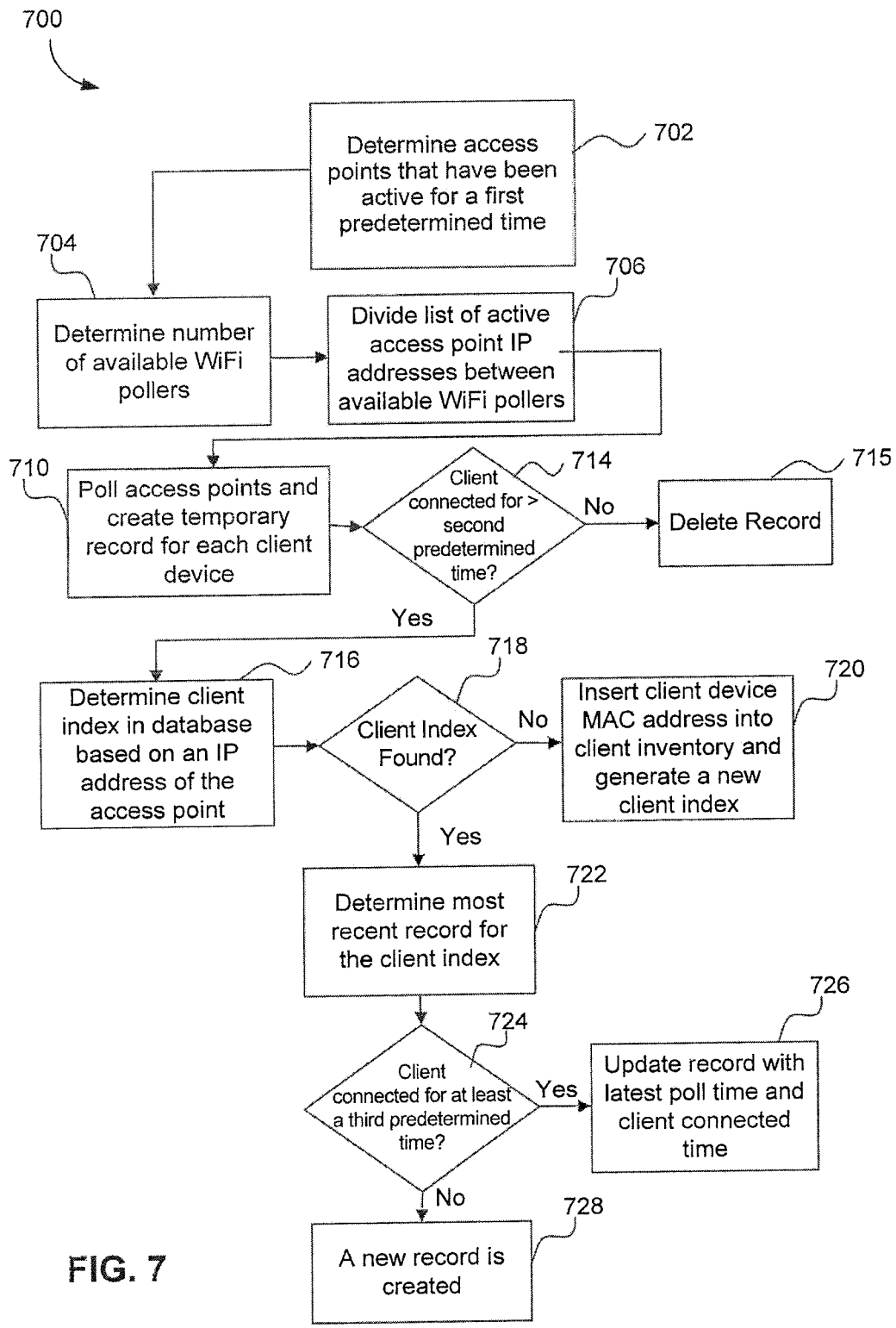
FIG. 7 illustrates an example flow chart of a method to poll access points and update client device data according to an embodiment of the invention.

FIG. 7 illustrates an example flow chart 700 of a method to poll access points and update client device data according to an embodiment of the invention. Flow chart 700 will be described with continued reference to the example operation environment depicted in FIGS. 1-2. However, flow chart 700 is not limited to these embodiments. Note that some steps in flow chart 700 do not necessarily have to occur in the order shown.

In step 702, IP addresses for WiFi access points that have been active for a first pre-determined period of time are determined by querying an access point inventory table. For example, WiFi manager 240 determines which access points 106 have been active within the last 15 minutes by looking up an access point inventory table in database 230.

In step 704, it is determined how many WiFi pollers are available for polling. For example, WiFi manager 240 determines which of WiFi pollers 208, 214 and 220 are available.

In step 706, the IP addresses for active WiFi access points determined in step 702 are distributed between available pollers. The IP addresses may be distributed using a round-robin scheme. For example WiFi manager 240 divides IP addresses of active access points 106 determined in step 702 amongst the available WiFi pollers 208, 214 and 220.

In step 710, active WiFi access points are polled to determine client devices connected to the WiFi access points and a temporary record is created for each client device that is polled. For example, WiFi pollers 208, 214 and 220 poll active WiFi access points in networks 222, 212 and 234 to determine which client devices 108 are connected to the WiFi access points 106 based i.e. the WiFi pollers 208, 214 and 220 determine the IP and MAC addresses for client devices 108 connected to WiFi access points 106.

In step 714, it is determined whether a client device has been connected to a WiFi access point for more than a second pre-determined period of time. For example, WiFi pollers 208, 214 and 220 determine whether a client device 108 has been connected to an access point 106 for greater than 10 seconds. The second pre-determined period of time is selected so that client devices that were briefly in the range of the access point or were not attempting to login to the network or connect to the access point are parsed out. In step 714, if it is determined that the client device has been connected for greater than the second predetermined period of time, then the process proceeds to step 716. If it is determined that the client is connected for less than the second pre-determined period of time, then the process proceeds to step 715.

In step 715, the record created in step 710 for each client is deleted. For example, WiFi manager deletes the record created for a client device 108.

In step 716, it is determined whether a client device index is present in a database using an IP address of the WiFi access point that the client device is connected to as a key. For example, WiFi manager queries database 230 to determine a client device index based on the IP address of the WiFi access point 106 that the client device 108 is connected to.

In step 718, it is determined whether a client index was found in step 716 for the associated access point IP address. For example, WiFi manager 240 determines whether a client index was found in step 716 for the associated access point IP address. If a client device index is not found, then the process proceeds to step 720. If a client device index is found, then the process proceeds to step 722.

In step 720, the client MAC address is added into a new record and a new client index is generated. For example, WiFi manager 240 creates a record and a new client index using a MAC address for the client device 108.

In step 722, the most recent record for that client index is referenced in a database. For example, WiFi manager 240 references the most recent record for the client index in database 230.

In step 724, it is determined whether the client device has been connected for at least a third predetermined period of time. For example, WiFi manager 240 determines whether the client device 108 associated with the client device index has been connected for at least 5 minutes. If it is determined that the client device 108 has been connected to the access point 106 for at least the third predetermined period of time, then the process proceeds to step 726. If it is determined that the client device has not been connected to the access point 106 for the third predetermined period of time, then the process proceeds to step 728.

In step 726, a client record is updated with a latest poll time from step 710 and for the period of time that the client has been connected to an access point. For example, one of WiFi pollers 208, 214 and 220 updates a client record in database 230 with a latest poll time from step 710 for the client device 108 and for a period of time that the client device 108 has been connected to an access point 106.

In step 728, a new record is created with at least the client device index, client device MAC, client device IP and the poll time from step 710. For example, one of WiFi pollers 208, 214 and 220 creates a new record in database 230 with at least the client device index, client device MAC, client device IP and the poll time from step 710.

Figure 8:
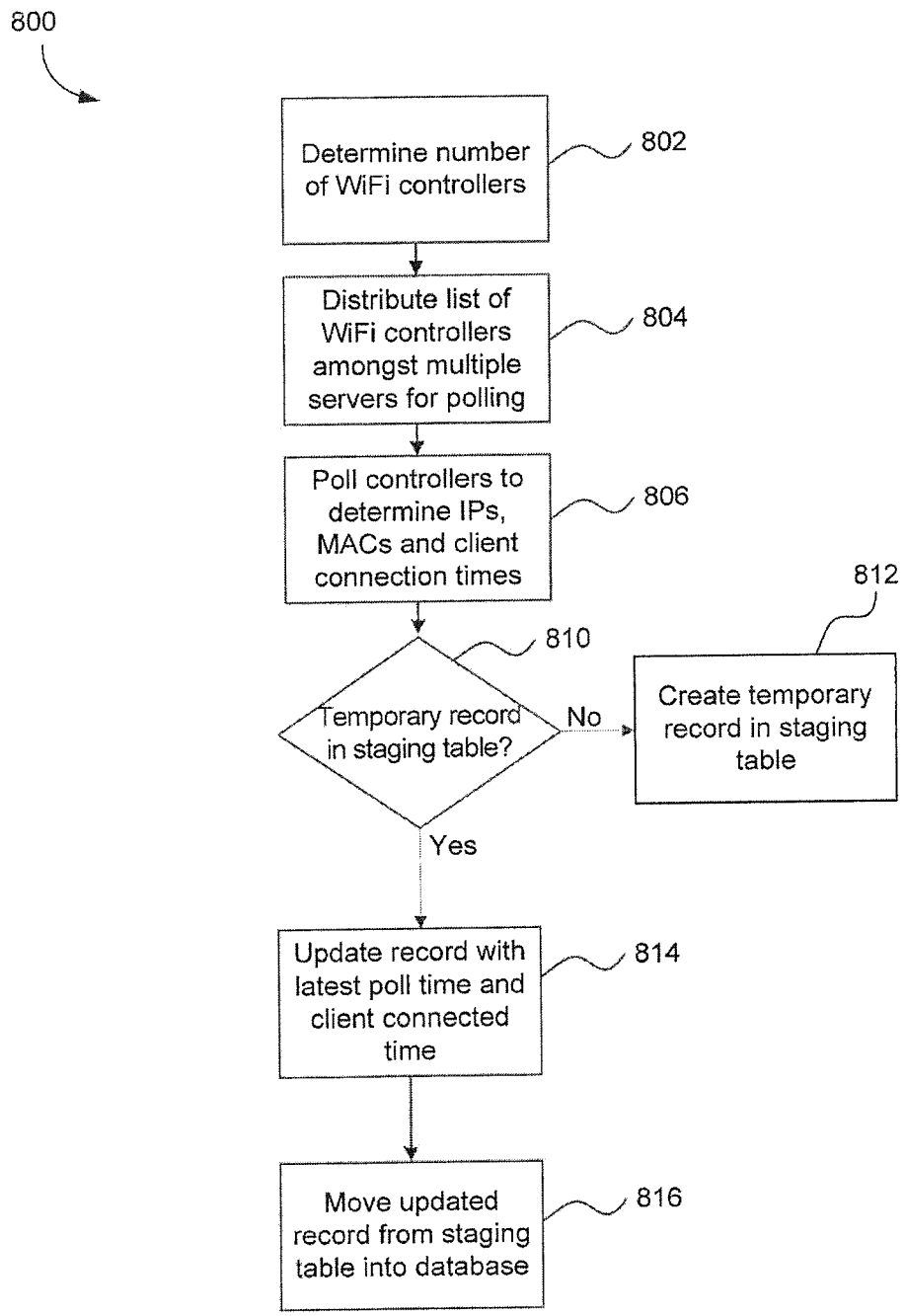
FIG. 8 illustrates an example flow chart of a method to periodically collect data from WiFi controllers according to an embodiment of the invention.

FIG. 8 illustrates an example flow chart 800 of a method to periodically collect data from WiFi controllers according to an embodiment of the invention. Flow chart 800 will be described with continued reference to the example operating environment depicted in FIGS. 1-2 However, flow chart 800 is not limited to these embodiments. Note that some of the steps in flow chart 800 do not necessarily have to occur in the order shown.

In step 802, a number of active WiFi controllers is determined. The WiFi controllers 250 are configured to periodically poll WiFi access points and determine a client device MAC, a client device IP and a time for which the client device is connected to a WiFi access point. Since WiFi controllers 250 periodically collect data from access points 106, only one WiFi poller, for example, WiFi poller 208 may be sufficient to collect data from WiFi controllers 250.

In step 804, the WiFi controllers determined in step 802 is distributed amongst multiple servers in a WiFi poller for polling purposes. For example, the WiFi controllers determined in step 802 are distributed amongst the servers in WiFi poller 208 for polling by WiFi poller 208. In other embodiments, the WiFi controllers 250 may be distributed across more than two servers or across multiple WiFi pollers such as WiFi pollers 208, 214 and 220.

In step 806, the WiFi controllers are polled to determine client device MACs, client device IPs and a period of time for which a client device has been connected to an access point in the network. For example, WiFi poller 208 polls WiFi controllers 250 to determine client device MACs, client device IPs and a period of time for which a client device 108 has been connected to an access point 106 in one of networks 222, 226 and 234.

In step 810, it is determined whether a record exists for a client device in a temporary staging table. If a record exists, then the process proceeds to step 814. If it is determined, that a record does not exist, then the process proceeds to step 812.

In step 812, if a temporary record does not exist for the client device, then the temporary record is created for the client device and updated with the latest poll time and the period of time a client device 108 has been connected to an access point 106 one of networks 222, 226 and 212.

In step 814, if a temporary record already exists, then the record is updated with the latest period of time the client device has been connected to the network. For example, WiFi poller 208 updates the record with the latest poll time and the period of time a client device 108 has been connected to an access point 106 one of networks 222, 226 and 212.

In step 816, the updated record in the staging table is moved into a database for storage. For example, WiFi poller 208 stores the updated record from step 814 in database 230.

Applications

Described below are example utility applications based on data collected from client devices 108 and access points 106 using the methods and systems described above. These applications may be accessible to, for example a network administrator or a cable administrator via a webpage accessible by private network 234. Table 1 below details example descriptions of database tables that may be stored in, for example, database 230.

TABLE 1

| Table Name | Description |
| --- | --- |
| tbl_RemedyWifi | Stores location and zone information about the Wifi device |
| tbl_RadioInventory | Stores plant information about every Wifi device discovered on the plant. |
| tbl_ControllerIndex | Stores all Cisco controllers (manually entry) |
| tbl_ArchivedRadios | Stores all Wifi devices that have not been seen on the plant for 7 days straight and were removed from the tbl_RadioInventory table |
| tbl_ClientInventory | Stores all unique client MAC addresses ever seen on the Wifi plant. Also stores a timestamp of when that client MAC address was first seen on the Wifi plant. |
| tbl_ClientConnectivity_RawData | Stores raw data received in the form of SNMP traps from BelAir devices |
| tbl_CiscoConnectivity_RawData | Stores raw data received in the form of SNMP traps from Cisco controllers |
| tbl_ClientRollup | Stores completed records rolled up from each raw data table (combination of trap and polling data). |

WiFi Outage Dashboard Application

The WiFi Outage Dashboard utility may present a user with a summary of the status of WiFi devices (WiFi devices may refer to one or more of WiFi access points 106, WiFi cable modems 104, CMTS 102 or client devices 108) for every hubsite in a specific network. The dashboard will list all hubsites with a status symbol for all WiFi devices that are online, offline or if no WiFi devices are deployed. For example, a green circle may indicate that all WiFi devices are operational, a red circle may indicate that at least one WiFi device is non-operational, and a white triangle may indicate that there are no WiFi devices deployed out of that hubsite. Next to the icons are numbers indicating how many WiFi devices there are online or offline. Each hubsite may include a link that provides further details about WiFi devices out of that hubsite. The access point inventory table in database 230 contains every WiFi device seen on the network along with the CMTS the WiFi device is registered with. The access point inventory table along with other data tables in database 230 provide the data for the WiFi Dashboard. Each hubsite on the dashboard may be represented by a hyperlink that when clicked, will display a page with details about the individual WiFi devices deployed out of that hubsite. The details page may include the device name, status, access point MAC address, and geographic location information. The access point MAC address may be a hyperlink to a WiFi live poll module that performs a live poll of the access point to determine its status as well as data on client devices connected to that access point. There may also be a hyperlink present that points to an inventory/data & map utility for the device that can put the access point and/or client device on a map (such as Google Maps™).

WiFi Inventory Management System

The WiFi Inventory Management System is a utility responsible for discovering new WiFi devices on a network, correlating network data with location information for the device and maintaining accurate records. The homepage of the WiFi Inventory/Mapping utility may include a summary of all WiFi devices based on vendor, location, and status on the network.

WiFi Inventory Application

The WiFi inventory/mapping utility allows a user to search for a WiFi device by WiFi cable modem MAC address, WiFi cable modem IP address, WiFi access point MAC address, WiFi access point IP address, WiFi broadcast (beacon) MAC address, WiFi zone, node or town. Any of these methods will return specific details about the WiFi device located in inventory. Details about the device may include street location information, as well as network specific data. The result view contains a link for the user to poll the WiFi device live on the plant. The device will also be mapped on a Google Map™ interface, and a heat print around the device will give an estimated coverage radius. A street level view of the WiFi device's location as per the availability of this feature through Google™ may give a user a view into the environment of the WiFi device. The Inventory/Mapping query page also displays a summary of the WiFi inventory data by devices seen on the plant (in last 24 hours), devices in walled garden and provisioned, and a distribution of counts of WiFi devices by region and local area. This data may be summarized from data stored in database 230 from polls conducted on WiFi access points and a WiFi inventory management system that runs in an application cluster on, for example, master headend 202.

Users can also search for WiFi devices on the plant via zone, node, or town. Each of these search methods will return a list of WiFi devices that match the search criteria, and users can select a device off the list to view the inventory details or poll the device live on the plant. The search by town method uses an instant database reference to auto complete the search field based on towns where WiFi devices are deployed.

The results of a WiFi device search by zone will present a list of devices that belong to the specified zone along with device details. The access point MAC address of the device may link to the WiFi device live poll, and a Inventory details/Mapping link for each device will display the inventory details and on Google maps.

The results of a WiFi device search by node will present a list of devices that belong to the specified node along with device details. The access point MAC address of the device will link to the WiFi device live poll, and the Inventory details/Mapping link for each device will display the inventory details and on Google maps.

The results of a WiFi device search by town will present a list of devices that are installed in the specified town along with device details. The access point MAC address of the device will link to the WiFi device live poll, and the Inventory details/Mapping link for each device will display the inventory details and Google maps.

Real Time WiFi Device Poller

The Real Time WiFi Device Poller utility gives users the ability to poll a WiFi device live via cable modem MAC address, cable modem IP address, access point MAC address or access point IP address. The poller will combine database and SNMP queries to retrieve detailed information about the WiFi device.

The Real time WiFi Device Poller is comprised of three utilities, the cable modem poller, the access point poller, and the cable modem deltas. The cable modem and access point pollers provide detailed information from each device and the cable modem deltas utility takes specific metrics and polls them at, for example, 35 second intervals and display the deltas between polls. Web servers may be provided that contain a script that makes a call to the application tier to do the processing and the results from all three poller utilities are combined and returned on a single formatted web page.

The WiFi Cable Modem Poller Utility does a connectivity check to a cable modem to determine its network status (offline or online) at the time of the poll. The utility then queries the radio inventory table in the database 230 to do a lookup of cable modem IP, CMTS, interface, vendor and node. The utility then supplements this data with data that is queried directly from the cable modem via SNMP. Lastly, a telnet to the cable modem's respective CMTS is done to do a live lookup of the access point MAC address, and access point IP address. Table 2 below lists all of the cable modem metrics queried in this utility.

TABLE 2

| Metric | Description | Source |
|---|---|---|
| Vendor | Vendor of the WiFi device | database |
| Cable Modem IP | IP address of the cable modem | database |
| UBR | CMTS where WiFi device is registered | database |
| Interface | Interface of the CMTS where the WiFi device is registered | database |
| Node | Node of the above UBR/Interface | database |
| System Description | Description of the Cable Modem | SNMP Query |
| System Uptime | Time since cable modem was powered | SNMP Query |
| Software Version | Software version running on the Cable Modem | SNMP Query |
| Config File | Filename of the configuration file | SNMP Query |
| DHCP Server IP | IP address of the DHCP server | SNMP Query |
| TFTP Server IP | IP address of the TFTP server | SNMP Query |
| Signal to Noise | SNR value from cable modem perspective | SNMP Query |
| Receive Power | Receive Power from cable modem perspective | SNMP Query |
| Transmit Power | Transmit Power from cable modem perspective | SNMP Query |
| Downstream Frequency | Frequency of downstream | SNMP Query |
| Upstream Frequency | Frequency of upstream | SNMP Query |
| QOS Profile | Active, Admitted, Provisioned service flows of cable modem | SNMP Query |
| AP MAC Address | Access Point MAC address | Telnet session to CMTS |
| AP IP Address | Access Point IP address | Telnet session to CMTS |

The cable modem poller utility also provides an option to export the cable modem log. This option will SNMP the log file from the cable modem and present in a separate browser window/tab.

There are separate access point poller utilities depending on the type of access point i.e. whether the access point can be polled via SNMP or via a WiFi controller 250. A first Access Point Poller Utility SNMP polls the access point for temperature and humidity levels, Layer 2 Tunneling Protocol (L2TP) status, and obtains any information about currently connected clients. These access points may also have an active alarm table, and will display any conditions where specific thresholds have been violated. The active alarm table is used to display any active alarms at the time of the live poll. All of this data is polled directly from the access point via SNMP.

The cable modem deltas utility polls various bandwidth and error tracking counters from different interfaces on the cable modem, for example at 35 second intervals, calculates the deltas and returns the results. This utility is automatically run whenever a WiFi device is polled live. The results of the cable modem and access point polling utility are displayed while the cable modem deltas utility is running so that there is no delay in viewing the polling results of the WiFi device. Table 3 below displays the bandwidth and error counters that are polled in the cable modem deltas utility. L2TP status displays the up/down status, uptime and peering IP of the tunnel from the access point's perspective.

TABLE 3

| Metric | Interface | Description |
|---|---|---|
| Downstream Bandwidth | Ethernet CPE | Downstream bandwidth total on Ethernet interface |
| Downstream Bandwidth | RF MAC | Downstream bandwidth total on RF MAC interface |
| Downstream Bandwidth | RF Downstream | Downstream bandwidth total on RF interface |
| Upstream Bandwidth | Ethernet CPE | Upstream bandwidth total on Ethernet interface |
| Upstream Bandwidth | RF MAC | Upstream bandwidth total on RF MAC interface |
| Upstream Bandwidth | RF Upstream | Upstream bandwidth total on RF interface |
| Unerroreds | RF | Codewords received without errors |
| Correcteds | RF | Codewords received with correctable errors |
| Uncorrectables | RF | Codewords received with uncorrectable errors |
| Downstream Errors | Ethernet CPE | Errors received on Ethernet CPE interface |
| Downstream Errors | RF MAC | Errors received on RF MAC interface |
| Downstream Errors | RF Downstream | Errors received on RF Downstream interface |
| Upstream Errors | Ethernet CPE | Errors received on Ethernet CPE interface |
| Upstream Errors | RF MAC | Errors received on RE MAC interface |
| Upstream Errors | RF Upstream | Errors received on RF upstream interface |
| T1Timeouts | RF | The cable modem has not received any periodic Upstream Channel Descriptor (UCD) messages from the CMTS within the timeout period. |
| T2Timeouts | RE | The cable modem did not receive a broadcast maintenance opportunity in which to transmit a Ranging Request (RNG-REQ) within the T2 timeout period (approximately 10 seconds). |
| T3Timeouts | RF | The cable modem has sent 16 Ranging Request (RNG-REQ) messages without receiving a Ranging Response (RNG-RSP) message in reply from the CMTS |
| T4Timeouts | RF | The cable modem did not received a station maintenance opportunity in which to transmit a Ranging Request (RNG-REQ) |

TABLE 3-continued

| Metric | Interface | Description |
| --- | --- | --- |
| | | message within the T4 timeout period (30 to 35 seconds). |

Real Time WiFi Device Poller Cable Modem Results

The results page may include the results from the cable modem side of the WiFi device. The cable modem status is color coded green if the cable modem is online and red if the cable modem is offline. The signal levels are color coded as shown in table 4 below.

TABLE 4

| Level | Metric | Color |
| --- | --- | --- |
| SNR | <28 | Red |
| Receive | >10 or <−10 | Red |
| Transmit | >55 or <30 | Red |

SNMP Access Point Poll results

The Access Point poll results display the environment variables (temperature, humidity, tunnel status) and the active alarm table which will display any active alarms at the time of the poll, and the client table which will display live client sessions for that WiFi device at the time of the poll.

WiFi Controller Access Point Poll results

The WiFi controller poll results display the controller name and IP address that the WiFi device is associated with, along with a client table which will display live client sessions for that WiFi device at the time of the poll.

WiFi Radio and Client Device Historical Data

This is a polling application to receive traps, poll, and store client device associations to WiFi access points across the network. Each time a client associates with a WiFi access point, the access point sends an SNMP trap notifying the application about the client device. Polling of the WiFi access points, for example, every 15 minutes supplements this data with other data about the client association session. This data is processed and rolled up into a database where the data will remain active, for example for 90 days, and is archived after that, for example for 1 year.

WiFi Client Session Interface

The WiFi client session interface module presents a user with the ability to view the most active access points or client devices by session for any arbitrary period of time, for example a year or in the past 24 hours, and also gives the user the availability to see the performance history for any client device or access point ever seen on any of networks 212, 222 and 226.

WiFi Client Statistics

A user can query the historical client session data collected by the WiFi polling application with a client device's MAC address. If the client device's MAC address was ever connected to any WiFi device in any network then the client session data can be retrieved. A user can enter the MAC address in either the 24 hour or yearly client history text box and click go to see specific information for that client.

The results of the 24 hour or yearly client search will return every session seen by that specific client device in the specified time period. The session data will include client IP address, RSSI, Session start time, duration of the session, WiFi device used, location, CMTS interface and node. In an embodiment, the WiFi device MAC address links directly to the Inventory/Mapping utility.

The top 10 clients by session button will return the top 10 client devices who have had the most number of sessions in the past year within the last 15 minutes. The results include the client device's MAC address, the manufacturer of that device, total number of sessions, and links to lookup the 24 hour or yearly history.

WiFi Radio Statistics

A user can also query the historical client device session data collected by polling as described above using a WiFi access point's MAC address. If the WiFi device has ever had any clients associated with it then the details of those sessions can be found here. The user has to enter the MAC address in either the 24 hour or yearly radio history text box and click go to see specific information for that radio.

The results of the 24 hour or yearly radio search will return every session seen by that specific radio in the time period specified. The session data will include client IP address, RSSI, Session start time, duration of the session, WiFi device used, location, CMTS interface and node.

The top radios by session button returns the radios that have had the most sessions in the past year within the last 15 minutes. The results include the WiFi device's MAC address, the vendor of that device, total number of sessions, and a link to lookup the inventory/mapping data. The WiFi device's MAC address is also a link to the real time WiFi poller utility to poll that WiFi device live. The total sessions number is linked to produce further details about each session.

Real Time Client Search

Real Time Client Search is a utility that allows a user to locate which radio(s) the client device is connected to in real time. The Real Time Client Search utility returns information regarding the radio's MAC address, the radio's IP address, a node the radio is connected to, the radio's location (GPS coordinates or cross-road reference), the pole identification, and the location's town. It also provides information about the client such as the client devices' MAC address, the client devices' IP address, the Received Signal Strength Indication (RSSI) levels, how long the client device has been connected to the radio in seconds, and the number of seconds since the last packet/frame to/from the client device was seen.

The Real Time Client Search utility is an application that is stored on each server of WiFi pollers 208, 214 and 220. The application is invoked by the webserver cluster when a user enters a client device's MAC address through a website. The utility searches for a client by using the SNMP characteristics that are available for both the access points and the WiFi controllers. In an embodiment, the client device hardware MAC address is included as part of the object identifier (OID) instance. For example in OID 1.3.6.1.4.1.14179.2.1.4.1.4.0.22.68.115.165.133 for a WiFi device, 0.22.68.115.165.133 (00:16:44:73:A5:85 in decimal notation) may represent the WiFi device's hardware MAC address.

When a client device's MAC address is provided via the web server, it is converted to decimal notation and appended to an OID and all the access points and WiFi controllers are queried via SNMP. The base OID for each vendor is appended with client device's MAC address in decimal notation so that only the access point or controller with the client device connected to it will return a result set from the SNMP query. Once the access point or controller is found, another set of SNMP queries are sent to gain further information such as the RSSI, and connected times. The data is linked with information about the radio such as location and IP address, formatted and returned to the webserver cluster.

The Real Time Client Search interface takes a client device's MAC address and submits it to one of WiFi pollers 208, 214 and 220. If found on the plant, the results may be presented on a website and the access point's MAC address may link to the Inventory/Mapping utility and the client MAC address may link to the yearly client history for that client device.

The present invention, or portions thereof, can be implemented in hardware, firmware, software, and/or combinations thereof.

Figure 9:
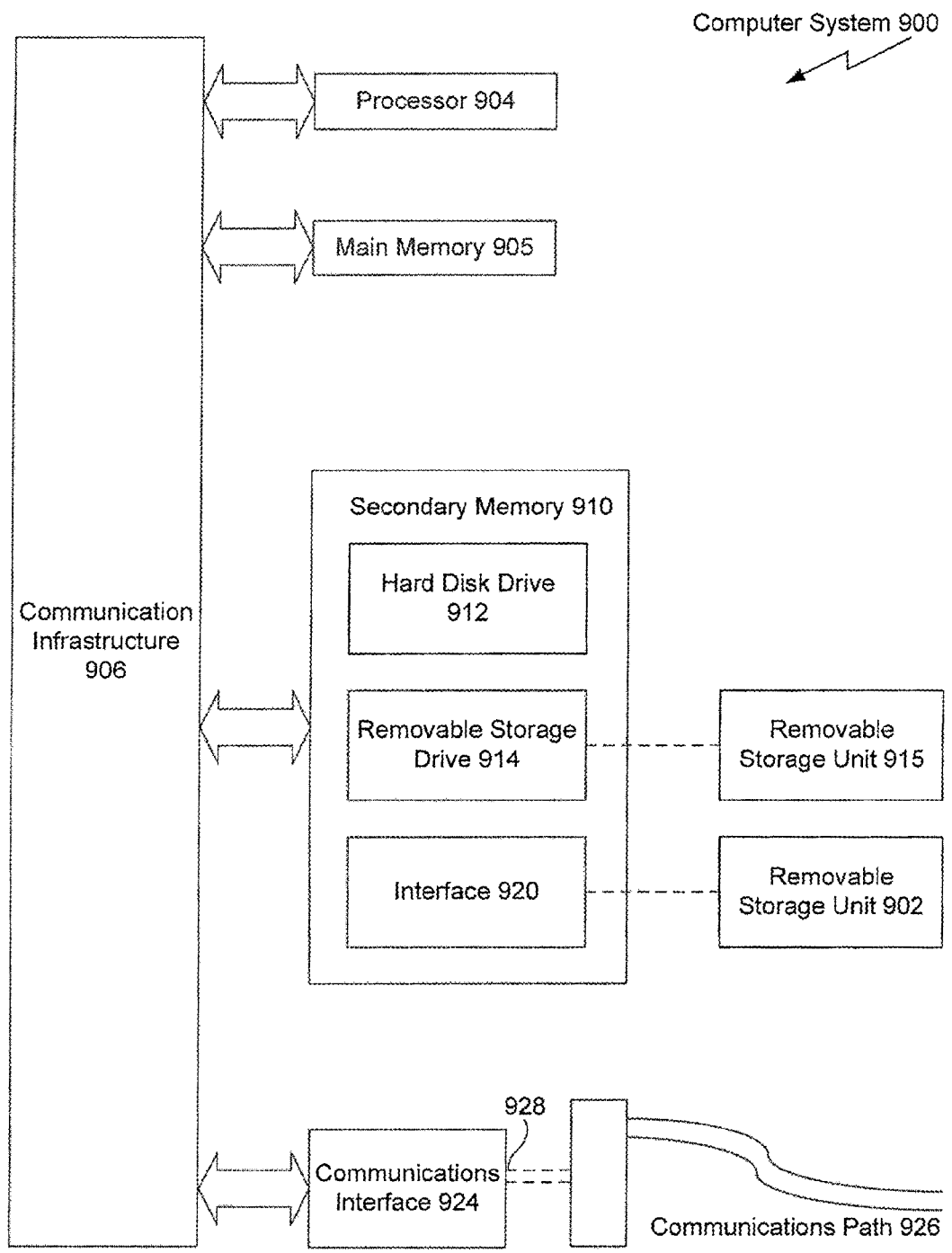
FIG. 9 is a block diagram of an exemplary computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 900 is shown in FIG. 9. The computer system 900 includes one or more processors, such as processor 904. Processor 904 can be a special purpose or a general purpose digital signal processor. The processor 904 is connected to a communication infrastructure 906 (for example, a bus or network). Various software implementations are described in terms of this exemplary computer system. After reading this description, it will become apparent to a person skilled in the relevant art how to implement the invention using other computer systems and/or computer architectures.

Computer system 900 also includes a main memory 905, preferably random access memory (RAM), and may also include a secondary memory 901. The secondary memory 901 may include, for example, a hard disk drive 912, and/or a removable storage drive 914, representing a floppy disk drive, a magnetic tape drive, an optical disk drive, etc. The removable storage drive 914 reads from and/or writes to a removable storage unit 915 in a well known manner. Removable storage unit 915, represents a floppy disk, magnetic tape, optical disk, etc. As will be appreciated, the removable storage unit 915 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 902 and an interface 920. Examples of such means may include a program cartridge and cartridge interface (such as that found in video game devices), a removable memory chip (such as an EPROM, or PROM) and associated socket, and other removable storage units 902 and interfaces 920 which allow software and data to be transferred from the removable storage unit 902 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a PCM-CIA slot and card, etc. Software and data transferred via communications interface 924 are in the form of signals 928 which may be electronic, electromagnetic, optical or other signals capable of being received by communications interface 924. These signals 928 are provided to communications interface 924 via a communications path 926. Communications path 926 carries signals 928 and may be implemented using wire or cable, fiber optics, a phone line, a cellular phone link, an RF link and other communications channels.

The terms "computer program medium" and "computer usable medium" are used herein to generally refer to media such as removable storage drive 914, a hard disk installed in hard disk drive 912, and signals 928. These computer program products are means for providing software to computer system 900.

Computer programs (also called computer control logic) are stored in main memory 905 and/or secondary memory 910. Computer programs may also be received via communications interface 924. Such computer programs, when executed, enable the computer system 900 to implement the present invention as discussed herein. In particular, the computer programs, when executed, enable the processor 904 to implement the processes of the present invention. Where the invention is implemented using software, the software may be stored in a computer program product and loaded into computer system 900 using removable storage drive 914, hard drive 912 or communications interface 924.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method to collect data on at least one client device wirelessly coupled to a device, comprising:
    receiving a notification from the device;
    parsing the notification to collect an inventory of the at least one client device coupled to the device and a time at which the at least one client device is coupled to the device; and
    polling the device to collect the data, the data including a period of time that the at least one client device has been coupled to the device and a physical location of the at least one client device.

2. The method of claim 1, further comprising:
    collecting an inventory of at least one WiFi cable modem coupled to the device.

3. The method of claim 2, wherein the polling comprises:
    polling the device based on an Internet Protocol (IP) address of the at least one WiFi cable modem.

4. The method of claim 1, wherein the data includes information about a number of client devices attempting to access a particular device.

5. The method of claim 1, wherein the physical location of the at least one client device includes approximate Global Positioning Satellite (GPS) coordinates of the at least one client device.

6. The method of claim 2, wherein the collecting comprises:
- connecting to a cable modem termination system (CMTS) to collect the inventory of the at least one WiFi cable modem coupled to the CMTS;
- grouping WiFi cable modems based on the CMTS that the WiFi cable modems are coupled to;
- connecting to the at least one WiFi cable modem through an associated CMTS to collect an inventory of at least one device, including the device, associated with the at least one WiFi cable modem;
- connecting to the at least one device associated with the at least one WiFi cable modem to determine an address of the device; and
- creating a record in a database, the record including at least the address of the at least one device and an Internet Protocol (IP) address of the at, least one device.

7. The method of claim 1, wherein the parsing comprises:
- determining a first media access control (MAC) address and a first Internet Protocol (IP) address of the device based on data from a trap;
- determining an access point index, stored in a database, for the device based on the IP address;
- determining, based on the trap, a second MAC address and a second IP address for the at least one client device that caused the trap to be generated;
- determining a client device index for the at least one client device based on the second IP address;
- creating a new client index in the database based on the second MAC address if the client device index is not found for the at least one client device;
- creating a record with the client index and a device index in the database if the client index is found and the record is not present in the database for that client index for a pre-determined period of time; and
- updating the record for the at least one client device with a timestamp that indicates when the trap was generated by the at least one client device, if the record is found for the client index in the database.

8. The method of claim 1, wherein the polling comprises:
- determining whether the device has been active for a first pre-determined period of time;
- polling the device when it is determined that the device has been active for the first pre-determined period of time to determine the at least one client device which is wirelessly coupled to the device;
- determining whether the at least one client device has been coupled to the device for more than a second pre-determined period of time; and
- determining whether a client device index is present in a database using an address of the device.

9. A system to collect data on at least one client device coupled to at least one device, comprising:
- a first component configured to receive a notification from the at least one device and to parse the notification to collect an inventory of the at least one client device coupled to the at least one device and a time at which the at least one client device is coupled to the at least one device; and
- a second component configured to poll the at least one device to collect the data, the data including a period of time that the at least one client device is coupled to the at least one device and a physical location of the at least one client device.

10. The system of claim 9, wherein the second component is configured to poll the at least one device based on Internet Protocol (IP) addresses of WiFi cable modems coupled to the at least one device.

11. The system of claim 9, wherein the data includes information about a number of client devices attempting to access a particular device within a specific network.

12. The system of claim 9, wherein the physical location of the at least one client device includes approximate Global Positioning Satellite (GPS) coordinates of the at least one client device.

13. The system of claim 9, further comprising:
- a cable modem termination system (CMTS);
- at least one WiFi cable modem, coupled to the CMTS, wherein the at least one device is coupled to the at least one WiFi cable modem and is configured to generate and send the notification to the at least one WiFi cable modem upon receiving a connection, an attempted connection or a login from the at least one client device; and
- a master headend system coupled to the CMTS and configured to collect an inventory of the at least one WiFi cable modem and the at least one device coupled to the at least one WiFi cable modem, and to update an Internet Protocol (IP) address of the at least one WiFi cable modem and the at least one device.

14. The system of claim 13, wherein the master headend system is further configured to:
- connect to the CMTS to collect the inventory of the at least one WiFi cable modem;
- group WiFi cable modems based on the CMTS that the WiFi cable modems are coupled to;
- connect to the at least one WiFi cable modem through its associated CMTS to collect an inventory of at least one device associated with the at least one WiFi cable modem;
- connect to the at least one device associated with the at least one WiFi cable modem to determine an address of the at least one device; and
- create a record in a database, the record including at least the address of the at least one device and an IP address of the at least one device.

15. The system of claim 13, wherein the master headend system is further configured to:
- periodically retrieve a list of WiFi cable modems in a database;
- determine a current IP address for the at least one WiFi cable modem by connecting to the CMTS associated with the at least one WiFi cable modem;
- compare the current IP address of the at least one WiFi cable modem to an IP address stored for the at least one WiFi cable modem in the database; and
- update the stored IP address in the database for the at least one WiFi cable modem with the current IP address for the at least one WiFi cable modem if the current IP address for the at least one WiFi cable modem is not equal to the stored IP address for the at least one WiFi cable modem.

16. The system of claim 13, wherein the master headend system is further configured to:
- group the at least one device based on the CMTS the at least one device is associated with;

determine a current IP address for the at least one device by connecting to the CMTS associated with the at least one device; and update a stored IP address in the database for the at least one device if the current IP address for the at least one device is not equal to the stored IP address in the database for the at least one device.

17. The system of claim 9, wherein the first component is further configured to:

determine a media access control (MAC) address and an Internet Protocol (IP) address of the at least one device that originated at least one notification based on information in the at least one notification;

determine an access point index, stored in a database, for the at least one device based on the IP address of the at least one device;

determine a MAC address and an IP address for the at least one client device that caused the at least one notification to be generated by the at least one device;

determine a client device index, stored in the database, for the at least one client device based on the IP address for the at least one client device;

create a new client device index in the database based on the MAC address of the at least one client device if the client device index is not found for the at least one client device;

create a record with the client device index and a device index in the database if the client device index is found and the record is not present in the database for that client device index for a pre-determined period of time; and update the record for the at least one client device with a timestamp that indicates when the notification was generated by the at least one client device, if the record is found for the client index in the database.

18. A system to collect data on at least one client device coupled to a device, comprising:

a processor; and a memory coupled to the processor, the memory configured to store a plurality of processing instructions for directing the processor to:

receive a notification from the device;

parse the notification to collect an inventory of the at least one client device coupled to the device and a time at which the at least one client device is coupled to the device; and poll the device to collect the data, the data on the at least one client device including a period of time that the at least one client device has been coupled to the device and a physical location of the at least one client device.

19. The system of claim 18, wherein the memory is further configured to store instructions for directing the processor to:

collect an inventory of WiFi cable modems coupled to the device.

20. The system of claim 18, wherein the data includes information about a number of client devices attempting to access the device.

* * * * *

UNITED STATES PATENT AND TRADEMARK OFFICE
CERTIFICATE OF CORRECTION

PATENT NO. : 9,705,776 B1  
APPLICATION NO. : 14/833606  
DATED : July 11, 2017  
INVENTOR(S) : Workman et al.

Page 1 of 1

It is certified that error appears in the above-identified patent and that said Letters Patent is hereby corrected as shown below:

On Page 2, in Item (56), References Cited, U.S. Patent Documents the following references are added:

| U.S. Reference No. | Publication Date | Name of Applicant |
|---|---|---|
| 2008/0155094 A1 | 06-26-2008 | Roese et al. |
| 2008/0262901 A1 | 10-23-2008 | Banga et al. |
| 2009/0070028 A1 | 03-12-2009 | Hempel |
| 2009/0124284 A1 | 05-14-2009 | Scherzer et al. |
| 2010/0052983 A1 | 03-04-2010 | Alizadeh-Shabdiz |
| 2010/0146057 A1 | 06-10-2010 | Abu-Hakima et al. |
| 2010/0222645 A1 | 09-02-2010 | Nadler et al. |

In Column 21, Line 22, "the at, least one" is replaced with --the at least one--.

Signed and Sealed this  
Twenty-second Day of May, 2018

Andrei Iancu  
*Director of the United States Patent and Trademark Office*